United States Patent
Fay, II

(10) Patent No.: US 10,582,659 B2
(45) Date of Patent: Mar. 10, 2020

(54) ACTIVE STEERING WINDROW SHIELDS

(71) Applicant: CNH Industrial America LLC, New Holland, PA (US)

(72) Inventor: Jeffrey Fay, II, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 559 days.

(21) Appl. No.: 15/216,209

(22) Filed: Jul. 21, 2016

(65) Prior Publication Data

US 2016/0324066 A1  Nov. 10, 2016

Related U.S. Application Data

(63) Continuation of application No. 13/626,834, filed on Sep. 25, 2012, now abandoned.

(51) Int. Cl.

| | |
|---|---|
| *A01D 34/00* | (2006.01) |
| *A01D 34/66* | (2006.01) |
| *A01D 57/28* | (2006.01) |
| *A01D 43/00* | (2006.01) |
| *A01D 45/00* | (2018.01) |
| *A01D 101/00* | (2006.01) |

(52) U.S. Cl.
CPC ......... *A01D 34/667* (2013.01); *A01D 34/664* (2013.01); *A01D 43/006* (2013.01); *A01D 45/00* (2013.01); *A01D 57/28* (2013.01); *A01D 2101/00* (2013.01)

(58) Field of Classification Search
USPC ........................................................ 56/15.6
See application file for complete search history.

(56) References Cited

U.S. PATENT DOCUMENTS

| | | |
|---|---|---|
| 3,059,403 A | 10/1962 | Bamford et al. |
| 3,523,410 A | 8/1970 | Taylor et al. |
| 3,721,073 A | 3/1973 | Scarnato et al. |
| 3,841,070 A | 10/1974 | Scarnato et al. |
| 3,911,649 A | 10/1975 | Scarnato et al. |
| 4,078,366 A | 3/1978 | Carmichael |
| 4,099,364 A | 7/1978 | Kanengieter et al. |
| 4,991,383 A | 2/1991 | Ermarcora |
| 5,412,929 A | 5/1995 | Urbain et al. |
| 5,930,988 A | 8/1999 | Hanson |
| 5,943,848 A | 8/1999 | Rice et al. |
| 6,401,441 B1 | 6/2002 | Chont |

(Continued)

FOREIGN PATENT DOCUMENTS

| | | |
|---|---|---|
| DE | 199 50 748 A1 | 4/2001 |
| WO | 2011012958 A1 | 2/2011 |

*Primary Examiner* — Thomas B Will
*Assistant Examiner* — Mai T Nguyen
(74) *Attorney, Agent, or Firm* — Patrick M. Sheldrake; Peter K. Zacharias

(57) ABSTRACT

A system for positioning crop windrow guide shields projecting generally rearwardly alongside the crop discharge stream as it exits an agricultural mower. The shields are coupled for simultaneous, coordinated movement and repositioned by a powered actuator in response to either a manual input by a vehicle operator or automatically by a controller based on a steering angle deflection between a tractor and a towed implement. The system may be adapted for use with a single implement being operated on a side hill to control windrow drifting. The system may also be used with simultaneously operated front-mounted and pull-behind mowers to direct the crop discharge streams into a merged windrow.

8 Claims, 4 Drawing Sheets

(56) References Cited

U.S. PATENT DOCUMENTS

| | | |
|---|---|---|
| 6,421,994 B1 | 7/2002 | Boucher et al. |
| 7,337,599 B2 | 3/2008 | Wilhelm |
| 8,234,033 B2 | 7/2012 | Brubaker et al. |
| 8,589,013 B2 | 11/2013 | Pieper et al. |
| 2009/0229233 A1 | 9/2009 | Pollklas et al. |
| 2011/0029909 A1 | 2/2011 | Matousek et al. |

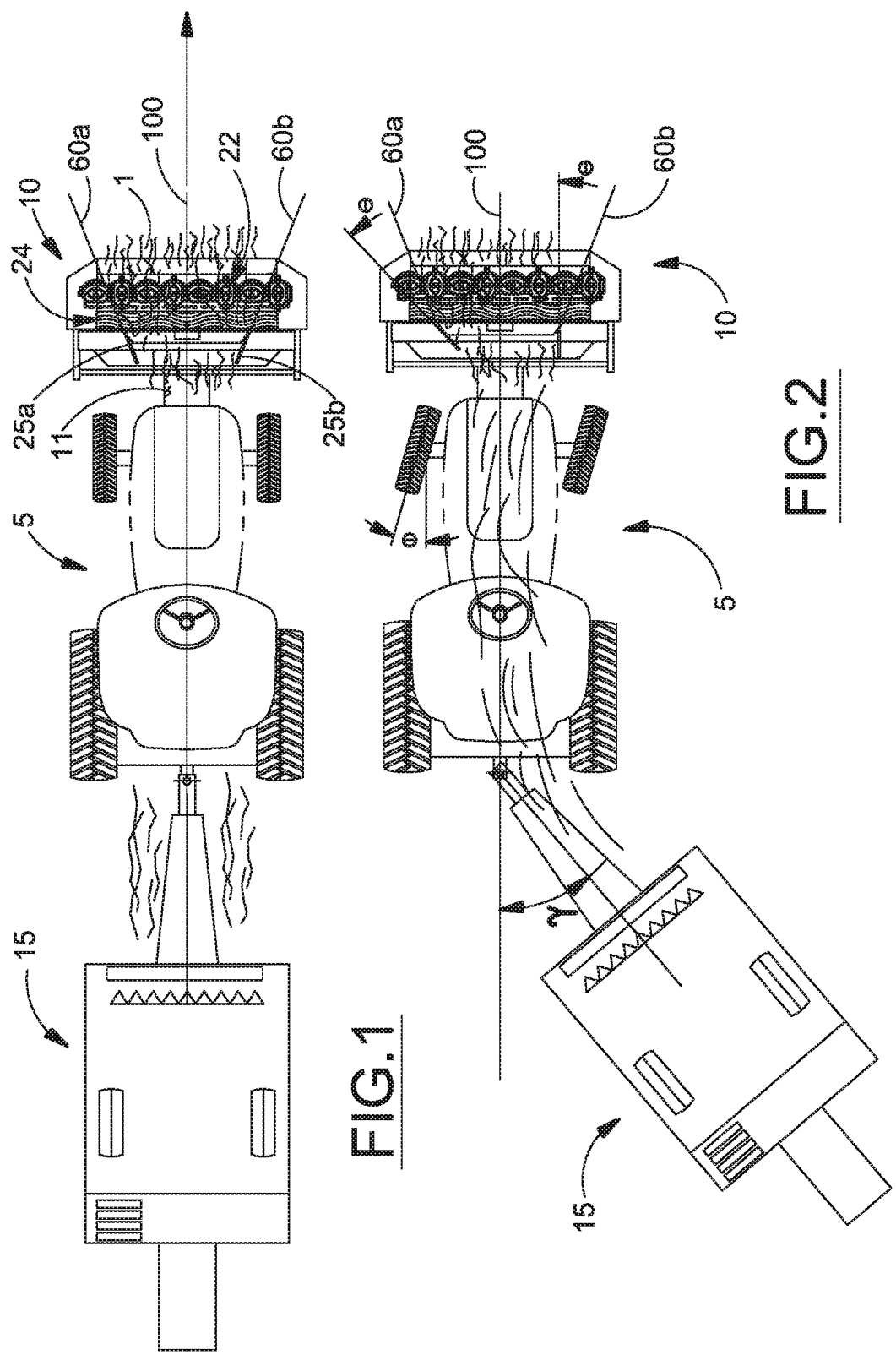

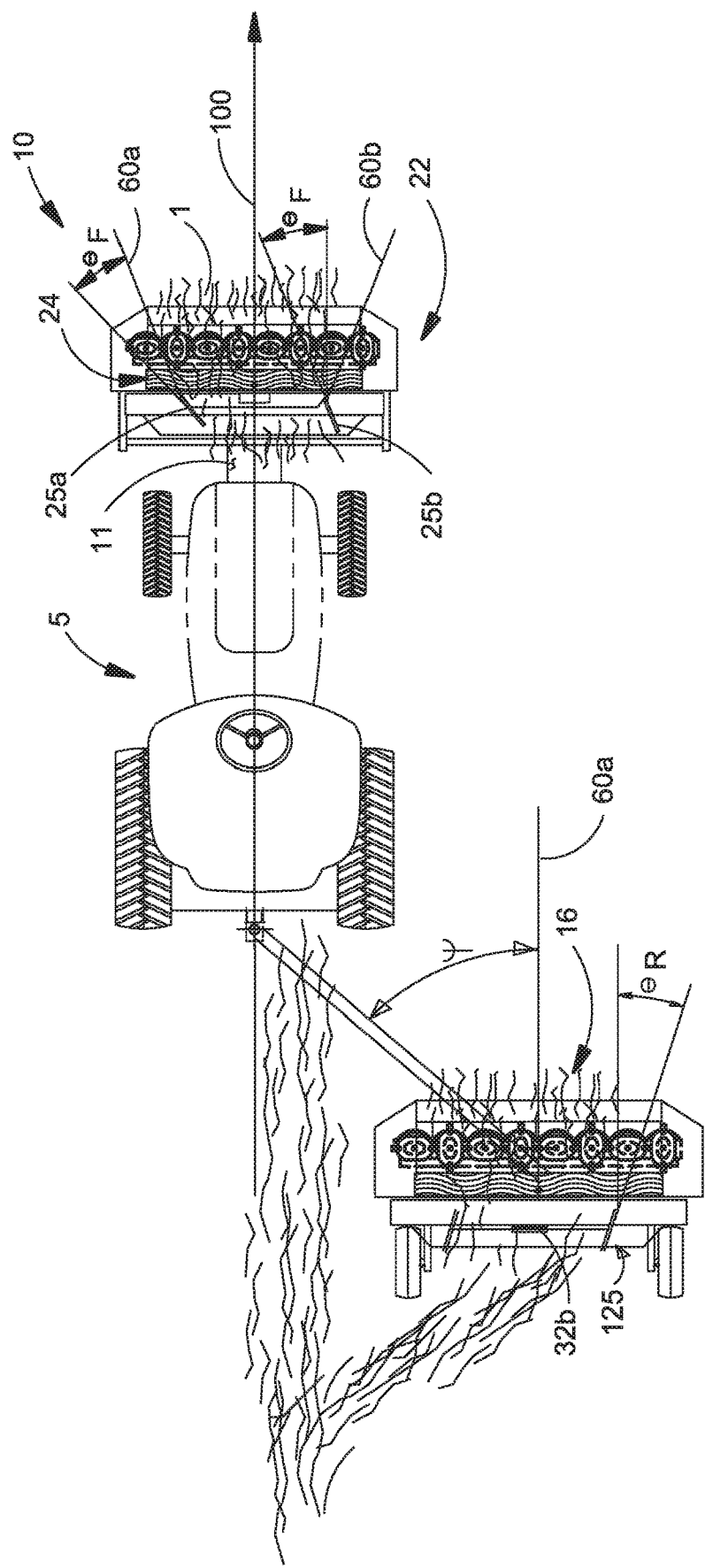

ACTIVE STEERING WINDROW SHIELDS

CROSS REFERENCE TO RELATED APPLICATIONS

This is a continuation of U.S. patent application Ser. No. 13/626,834, entitled "ACTIVE STEERING WINDROW SHIELDS", filed Sep. 25, 2012, which is incorporated herein by reference.

BACKGROUND OF THE INVENTION

This invention relates generally to harvesting machines, such as mowers, of the type having guide panels to influence the trajectory of the crop material being discharged from the mower, and, more particularly, to a system for automatically repositioning the crop guide panels to ideally place a crop windrow for engagement by a trailing implement even as the harvesting machine traverses a non-straight path.

Single pass harvesting operations often involve mounting a mower on the front hitch of a tractor and towing a baler or other implement behind the tractor where it engages the cut crop windrow deposited on the ground by the mower. While feeding of mowed crop to the towed implement is normally centered during straight, flat operation, the system cannot effectively direct the cut crop windrow to the towed implement during turns or on side hills. The forward mounted and towed implements track on different turning radii as the vehicle is turned and the cut crop windrows tend to drift downhill during side hill operation. Misalignment of the windrow and the towed implement pickup assembly causes cut crop to be left in the field and/or uneven feeding resulting in pickup assembly plugging, poor feed performance, or misshapen bales.

Crop flow discharged from the mower is directed using a combination of shields, guides, and deflectors positioned to act upon the crop material as it is discharged from the mower or a conditioner mechanism and direct the crop material to a desired arrangement on the ground. Current machines include windrow shields that can be adjusted, either manually or by manually actuated mechanical apparatus, to various windrow widths or set to laterally direct the windrow to one side of the machine or the other. Shield adjustment is typically accomplished using tie-rods secured to the mower rear frame or the rear bodywork which allows the shields to be positioned to produce a desired windrow configuration. Such arrangements to not typically allow for on-the-fly adjustment of the shields in response to changing tractor-implement alignments.

It would be desirable to provide a crop shield positioning apparatus that is adapted to use non-manual means to reposition the crop shields to alter lateral placement of the resulting windrow in response to then-present field conditions. The benefits are magnified by a crop shield positioning apparatus that includes automatic shield adjustment to adjust crop shield position on-the-fly so that a windrow from a forward-mounted mower will be ideally positioned for pickup by a towed implement, even as the tractor-implement combination turns from a straight-line path. Further benefits would be realized by crop shield positioning apparatus that allows the vehicle operator to manually adjust crop shield position to suit field conditions encountered. Still further benefits would be realized by a crop shield positioning apparatus that is easily incorporated into current production mower-conditioners without significant alteration of the machine design.

SUMMARY OF THE INVENTION

Accordingly, the present invention, in any of the embodiments described herein, may provide one or more of the following advantages:

It is an object of the present invention to provide a steering mechanism for windrow guide shields on an agricultural mower that enables lateral deflection of the crop discharge stream to be selectively altered during machine operation.

It is another object of the present invention to provide an active steering mechanism for coupled windrow guides on a forward-mounted agricultural mower operated in conjunction with a towed agricultural implement having a crop pickup wherein the active steering mechanism maintains the crop windrow positioned for pickup by the towed implement, even as the machine is turning from a straight-line path.

It is another object of the present invention to provide a steering mechanism for windrow guides on a forward-mounted agricultural mower operated in conjunction with a towed agricultural implement having a crop pickup wherein the steering mechanism allows the crop windrow to be positioned for pickup by the towed implement as the machine traverses uneven terrain, such as a side hill.

It is a further object of the present invention to provide a steering mechanism for windrow guides on an agricultural mower that enables lateral deflection of the crop discharge stream on a forwardly mounted mower operated in conjunction with a towed center-pivot mower also equipped with said steering mechanism to eliminate the need for a separate crop windrow merger apparatus.

It is a still further object of the present invention to provide a steering mechanism for positioning adjustable crop guides on an agricultural mower that is durable in construction, inexpensive of manufacture, carefree of maintenance, easily assembled, and simple and effective to use.

These and other objects are achieved according to the instant invention by providing a system for positioning crop windrow guide shields projecting generally rearwardly alongside the crop discharge stream as it exits an agricultural mower. The shields are coupled for simultaneous, coordinated movement and repositioned by a powered actuator in response to either a manual input by a vehicle operator or automatically by a controller based on a steering angle deflection between a tractor and a towed implement. The system may be adapted for use with a single implement being operated on a side hill to control windrow drifting. The system may also be used with simultaneously operated front-mounted and pull-behind mowers to direct the crop discharge streams into a merged windrow.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a plan view of a typical agricultural tractor having a front-mounted mower incorporating the principles of the present invention and towing a baler arranged for single-pass harvesting operations;

FIG. 2 is a plan view of the tractor-equipment combination of FIG. 1 illustrating relative positions as the combination is turning;

FIG. 3 is a plan view of an agricultural having a front-mounted first mower and towing a second mower wherein both mowers incorporate the present invention configured for merging of two windrows;

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to the figures, FIGS. 1 and 2 in particular show top views of an agricultural tractor 5 having a forwardly-mounted mower 10 for severing a standing crop from the ground and towing an agricultural implement 15 for gathering the severed crop as the tractor 5 travels forwardly across the ground (along axis 100) in what is commonly referred to as a single-pass harvesting operation. The exemplary towed implement 15 shown in FIGS. 1 and 2 is a baler, but it could be any towed implement that gathers a cut crop from the ground for subsequent processing or packaging.

Figure 4:
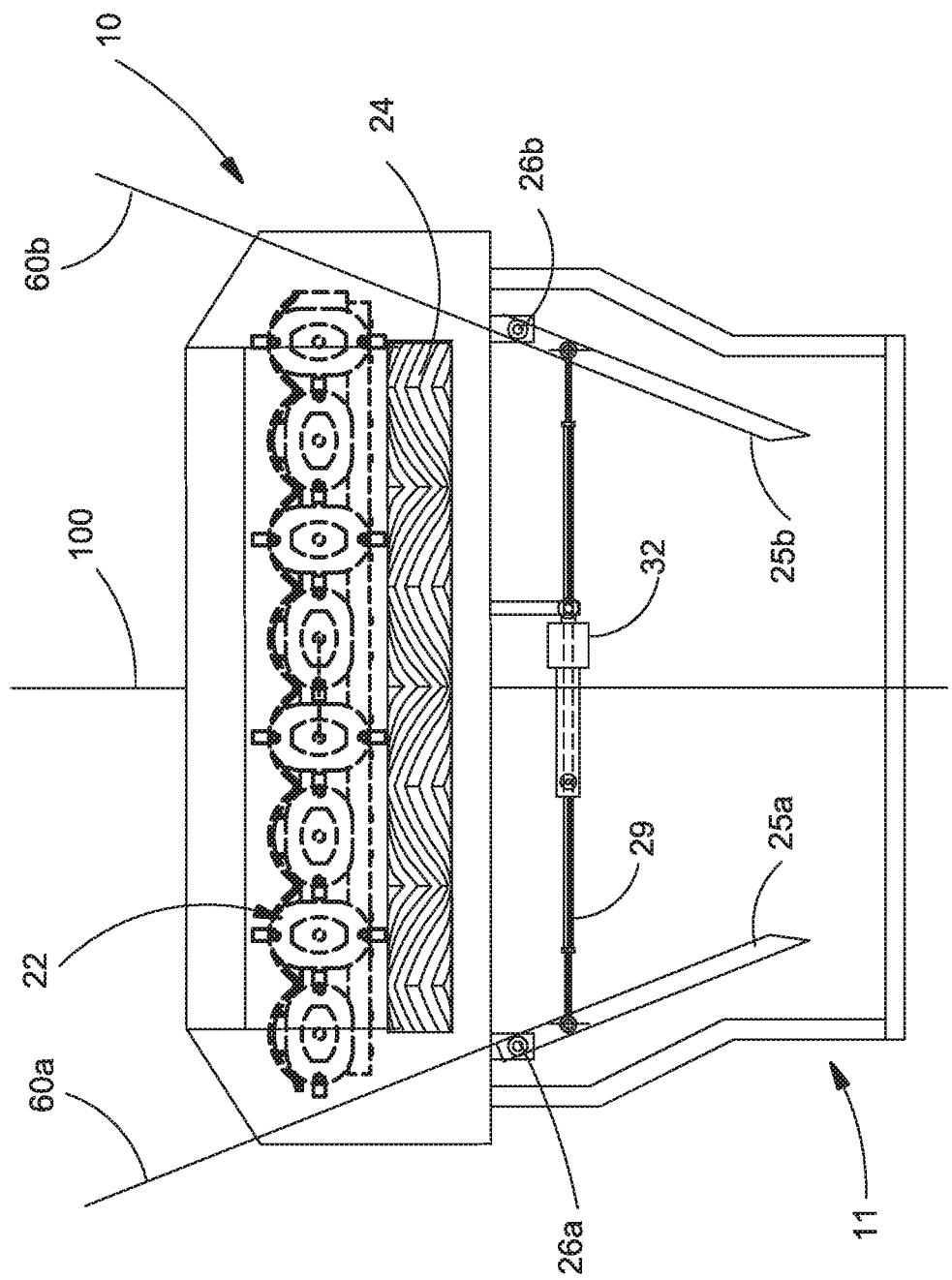
FIG. 4 is a partial plan view of a mower as illustrated in FIGS. 1 through 3 incorporating one embodiment of the present invention.

Referring specifically to FIG. 4 in conjunction with the other figures, the mower 10 is operably connected to and supported by the tractor using frame 11 which preferably configured for connection to a conventional forward-mounted three-point hitch apparatus (not shown). The frame 11 and hitch apparatus is thus configured to raise and lower the mower 10 relative to the ground surface to support mowing and transport operations. The standing crop 1 is severed from the ground by a transversely disposed cutting apparatus 22 whereupon it is centrally converged in the mower 10. A conditioning mechanism 24, if present, may comprise a pair of transversely elongate conditioning rolls as shown, or it may comprise a flail-type conditioner in which crop passes between a single roll with radially arranged flails and a closely proximate adjacent surface in order to crush the crop material. The severed crop is then ejected rearwardly from the conditioner mechanism 24 in an airborne stream whereupon a pair of windrow guide shields 25a, 25b positioned laterally adjacent to the airborne crop stream on opposing sides of the stream interact with the stream. The generally vertically planar surface of each guide shields interacts with the crop stream and thereby influences the width and lateral trajectory of the crop stream. The forward end of each of the windrow guide shields 25 is pivotally connected to the mower 10 by generally vertically oriented hinges 26a, 26b that allow the opposite (free) end of the windrow guide shields to swing inwardly and outwardly relative to the mower longitudinal centerline 100.

In the present invention, the windrow guide shields 25a, 25b are linked for simultaneous pivotal movement by tie rod 29. The tie rod 29 is configured so that the guide shields move in unison (e.g., the shields move in the same lateral direction when moved). Movement of the windrow guide shields is accomplished by motion of actuator 32 which is connected to the frame 11 at one end and the opposite end connected to one of the windrow guide shields 25 or the tie rod 29. The tie rod 29 may be either of single or multi-piece construction and must allow for adjustment of the normal position of the windrow guide shields to accommodate various width windrows. Actuator 32 may be an electric actuator, hydraulic cylinder, or linear actuator, or the like which is capable of selectively positioning the windrow guide shields in response to an input signal.

By coupling the windrow guide shields 25, the shields may be "steered" during operation to deposit cut crop material in the path of the towed implement 15. In straight-ahead travel, the shields are positioned in a normal position, aligned along axes 60a, 60b. The normal position of the windrow guide shields may be manually adjusted by altering the tie rod 29 length and/or connection position on the shields 25 to alter the width of the resultant windrow. During a right hand turn (see FIG. 2), the windrow shields will steer to the right (by an angle Θ from the normal axes 60a, 60b) so that the cut crop material is directed toward the center of the turn where it may be gathered by the pick-up of the towed implement.

Figure 5:
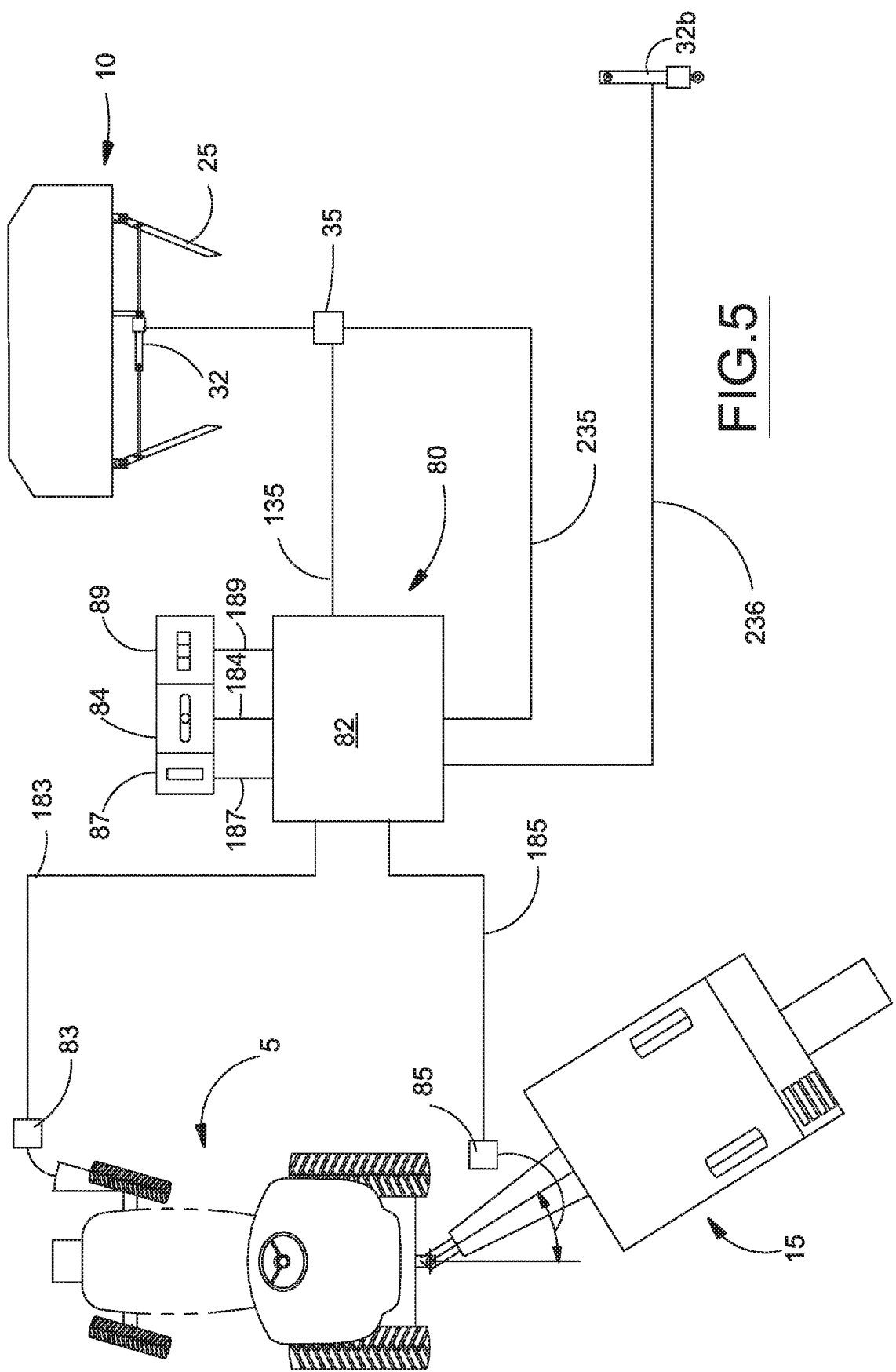
FIG. 5 is a schematic diagram of a control system for managing movement of steerable windrow guide shields.

Now referring to FIG. 5 with reference to FIGS. 1 through 4, a control system 80 for managing the position of windrow guide shields 25a, 25b is shown comprising a control unit 82 configured to receive a plurality of position input signals from a tractor steering sensor 83, a manual input control 84, a towed implement tongue angle sensor 85, and an override input switch 89, each operably connected to the control unit 82 by input conductors 183, 184, 185, and 189 respectively. A guide shield position feedback signal generated by actuator relay 35 or the actuator 32 (depending upon the type of actuator employed) may be communicated to the control unit by feedback conductor 135 to enhance control functionality by using guide shield position feedback. Alternatively, the control system may simply determine shield position based upon position output signals directed to the actuator 32 when in active control to reduce system complexity and cost. An output signal from the control unit 82 is communicated to the actuator 32 via output conductor 235 to manage the position of the guide shields 25, whether by active or passive control means. The control unit 82 may be a programmable controller employing a micro-processor or the like capable of receiving input signals and generating out signals in response thereto. Communication conductors may be dedicated circuits, incorporated into a vehicle communication bus (e.g., CANBUS), or a combination thereof. Use of such on-board computer control systems which are typically present in tractors of the type normally capable of handling substantial front-mounted implements also readily allows an operator display to be incorporated to provide visual indication of the windrow guide shield position, operational mode, warning alerts and the like without necessitating additional equipment added to the tractor.

Control of the windrow guide shield 25 position is either by means of an operator-controlled passive switch 84 or an active function managed by the control unit 82. A mode switch 87 allows the vehicle operator to choose between automatic and passive modes of guide shield control. The mode switch may be provided as a stand-alone switch or integrated into an existing on-board operator control interface which is commonly installed on tractors of the type on which forward and pull-behind mowers are simultaneously operated. In one embodiment, the override input switch 89 is a three-position, spring return to center toggle switch. The control unit 82 operates in the active steering mode when the active function is selected from mode switch 87 and the override input switch 89 is in the center position. Should the vehicle operator need to manually adjust the windrow guide shield position, movement of the override input switch 89 to either the right or left would disengage the active steering function and manually adjust the shield position in the desired direction. A fixed rate of movement allows the vehicle operator to press and hold the override input switch 89 in the desired direction until the desired shield position is reached. The override input switch returns to the center position upon release, but the shields remain in position until the active mode is re-engaged using the mode switch 87. Alternatively, a separate manual input control switch 84 may be provided to allow the vehicle operator to manually adjust windrow guide shield position when the system operates in the passive mode. Input control 84 is preferably a two-position momentary switch. Toggling the switch to the left steers the shields left; likewise toggling to the right steers the shields to the right. Economy and operational ease is improved by combining the function of the input control switch 84 and the override input switch 89 into a single switch unit.

When operating in the active control mode, the control system 82 determines a desired windrow guide shield position ($\Theta$) based upon steering angle ($\Phi$) provided by tractor steering sensor 83 and the implement angle relative to the tractor centerline (Y) provided by implement tongue angle sensor 85 using a cross-track error relationship of e=($\Phi$)+Y. The basic control function is defined by the relationship:

$$\Theta = a(\Phi + Y) + b$$

where a is equal to the windrow shield steering ratio based on tractor wheelbase and b is equal to the windrow shield max position based on tractor track.

The automatic function allows the guide shields to be properly positioned. The operator override input function is provided to allow the vehicle operator to steer the windrow shields to compensate for implement drift, such as would be necessary during extreme side hill operation when the shields are moved in the direction opposite to that which the tractor is steered. When a single pass system drifts downhill to the left, for example, the tractor is typically steered uphill to the right to compensate. The control system 82 monitors both steering angle ($\Phi$), and implement angle relative to the tractor centerline (Y) This steering correction could cause the active shield steering system to deposit crop to the right side, uphill of the towed implement, causing further windrow misalignment. The center position can be selected to provide active operation, where the windrow shields are positioned based on tractor steering angle and implement tongue angle which handles most field and terrain conditions normally encountered. The left and right manual override positions can then be selected to override the active operation and place the windrow shields in the position to best align with the towed implement during extreme side-hill operation or other conditions when the active function is not ideally placing the forward mower windrow.

Referring to FIGS. 3 and 5, the tractor 5, mower 10 and a towed implement are shown wherein the towed implement is a pull-behind mower 16 that has been equipped with steerable windrow guide shields 25 similar to the shields provided on front-mounted mower 10. In this configuration, controller 82 provides output signals to two actuators 32, one for the front-mounted mower 10 via output conductor 235 and a second 32b for the towed mower 16 via output conductor 236, the exemplar towed mower 16 being a center-pivot mower. In this mode of operation, the operational objective is to direct the windrows from the two mowers toward a single lateral location (merge) without the need for a separate merger apparatus.

This operational objective is accomplished by positioning the front windrow guide shields 25 to direct the windrow toward the side on which the trailing mower is located, shown as angle $\Theta_F$ in FIG. 3. The front windrow guide shields 25, once so positioned, will remain stationary in the passive mode of the controller (e.g., no guide shield position adjustment based on steering or hitch angle). The windrow guide shields 125 on the trailing mower 16 are positioned to direct the windrow toward the tractor centerline, shown as angle $\Theta_R$ in FIG. 3 which is opposite in direction to $\Theta_F$. The result of aligning the forward windrow guide shields 25 and rearward guide shields 125 in opposite directions is to place the windrow from the trailing mower 16 on or adjacent to the windrow from the forward mower 10 so that both windrows may be gathered in a subsequent single pass by a crop packaging implement, such as a baler. In this mode of operation, controller 82 senses the lateral position of the implement 16. Implement lateral position may be determined by using the tongue angle sensor 85 positioned at the implement/tractor hitch as in the above-described configuration for trailing implements or by relocating the tongue angle sensor 85 on the trailing implement to the implement 16 to measure the tongue or implement offset angle $\Psi$ relative to the implement itself, a common measure in center-pivot mowers. The latter approach is preferred to eliminate tractor turning from the determination of the lateral offset of the towed implement 16. As the offset angle $\Psi$ increases, the controller 82 will send an output signal to rear actuator 32b to position the windrow guide shields to direct the windrow toward the tractor centerline 100. During typical center-pivot mower operation, the guide shields will generally be positioned at or near the limit of $\Theta_R$ in order to direct the windrow as far as possible toward the tractor center and the windrow deposited by the front-mounted mower 10. Only as the center-pivot mower is moved into position behind the tractor ($\Psi$ approaches 0) will the operator begin to adjust the position of the rear windrow guide shields 125 and reduce the angle $\Theta_R$ toward a normal position (comparable to alignment 60a, 60b described in connection with the front-mounted mower 10).

The active/passive functions and mode switching for the combination of two mowers operating to merge windrows are as described above for the front-mounted mower/trailing implement combination function. Additional control inputs may be provided via the operator interface to set the controller into a front guide shield control or rear guide shield control as appropriate.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A mower for connection to an agricultural tractor, the mower comprising a cutting apparatus for severing a standing crop from the ground and a crop guide apparatus for directing an airborne flow of crop material rearwardly therefrom to form a windrow on the ground, the crop guide apparatus comprising:
   first and second windrow guide shields, each windrow guide shield having generally opposing forward and rearward ends and positioned on opposing lateral sides of the airborne flow of crop material, each of the windrow guide shields being pivotally coupled near the forward end to the mower to enable the respective rearward ends of the shields to move laterally inwardly and outwardly relative to the airborne crop flow;
   an actuator configured to cause the first and second windrow guide shields to pivot between opposing right and left extreme positions; and
   a control system configured for receiving at least one input signal from the mower or an operator input device, the at least one input signal is used to determine a desired guide shield position based upon the received at least one input signal and initiating an actuator signal representative thereof, the actuator signal being communicated to the actuator to cause the pivotal position of the first and second windrow guide shields to laterally influence the windrow as the tractor moves away from a straight-ahead course wherein the control system is further configured for receiving an at least one input signal from a steering angle sensor for measuring a steering angle ($\Theta$) of the agricultural tractor, wherein the control system is further configured for receiving an at least one input signal from an implement trailing angle sensor for measuring a trailing angle of a towed implement relative to the tractor.

2. The mower of claim 1, wherein the operator input device is configured to generate and communicate a first operator input signal to the control system having at least an active state and an inactive state, the control system further being configured with an active mode and an inactive mode engaged upon receipt of the respective active state or inactive state of the first operator input signal from the operator input device.

3. The mower of claim 2, wherein the operator input device further comprising an override input device configured to generate and communicate a second operator input signal to the control system, the second operator input signal having at least a right state, a neutral state, and a left state, the control system being configured to automatically initiate the actuator signal when in the active mode and the second operator input signal is in the neutral state, the control system further being configured to initiate the actuator signal to cause movement of the first and second windrow guide shields toward the right extreme position or the left extreme position in response to receipt of the right state or left state signal, respectively, and to change from the active mode to the inactive mode thereby enabling non-automatic positioning of the windrow guide shields.

4. The mower of claim 2, wherein the operator input device further comprising a manual input device configured to generate and communicate a third operator input signal to the control system, the third operator input signal having at least a right state, a neutral state, and a left state, the control system being further configured to initiate the actuator signal upon receipt of the third operator input signal when in the inactive mode to cause movement of the first and second windrow guide shields toward the right extreme position or the left extreme position, respectively, in response to receipt of the right state or left state signal.

5. The mower of claim 1, wherein the control system is further configured for receiving input signals from the mower and the agricultural tractor and an operator input device and a towed implement, the input signals are used to determine a desired guide shield position based upon the received input signals.

6. The mower of claim 1, wherein the mower further comprises a tie rod connecting the first and second windrow guide shields in a manner whereby the guide shields move in unison, the tie rod is manually adjustable to enable the respective rearward ends of the first and second windrow guide shields to be moved inwardly toward the airborne crop flow or outwardly away from the airborne crop flow thereby enabling the windrow width to be selectively adjusted.

7. The mower of claim 1, wherein the mower is a front-mounted mower.

8. The mower of claim 1, wherein the mower is a pulled-type mower, being able to be connected by a pivoting hitch to the tractor enabling the mower to be laterally displaced from a longitudinal centerline of the tractor by varying a pivot angle (Y) of the pivoting hitch.

* * * * *